US006960955B2

(12) United States Patent
Nonaka

(10) Patent No.: US 6,960,955 B2
(45) Date of Patent: Nov. 1, 2005

(54) CHARGE PUMP-TYPE BOOSTER CIRCUIT

(75) Inventor: Yoshihiro Nonaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/625,779

(22) Filed: Jul. 24, 2003

(65) Prior Publication Data

US 2004/0196095 A1 Oct. 7, 2004

(30) Foreign Application Priority Data

Jul. 31, 2002 (JP) .......................................... 2002-222291

(51) Int. Cl.[7] .................................................. G05F 3/02
(52) U.S. Cl. .......................... 327/536; 327/537; 363/60
(58) Field of Search ................................. 327/536, 537; 363/59, 60

(56) References Cited

U.S. PATENT DOCUMENTS 3,824,447 A * 7/1974 Kuwabara .................... 363/60
5,051,881 A * 9/1991 Herold ........................ 363/60
5,397,931 A * 3/1995 Bayer ......................... 327/306
5,606,491 A * 2/1997 Ellis ............................ 363/60
5,668,710 A * 9/1997 Caliboso et al. .............. 363/60
6,021,056 A * 2/2000 Forbes et al. ................. 363/60
6,400,210 B2 * 6/2002 Myono ....................... 327/536
6,456,152 B1 * 9/2002 Tanaka ....................... 327/536
6,504,422 B1 * 1/2003 Rader et al. ................ 327/536
6,556,064 B1 * 4/2003 Yatabe ....................... 327/536

FOREIGN PATENT DOCUMENTS

| | | |
|---|---|---|
| JP | 9-191639 | 7/1997 |
| JP | 2000-236658 | 8/2000 |

* cited by examiner

*Primary Examiner*—Terry D. Cunningham
(74) *Attorney, Agent, or Firm*—McGinn Ip Law Group, PLLC

(57) ABSTRACT

A charge pump-type booster circuit can reduce numbers of switches and capacitors. The charge pump-type booster circuit has a first electronic switch and a second switch connecting a high potential terminal and a low potential terminal of a charge capacitor are connected to a not grounded terminal of a first output capacitor connected to the ground at one side. These electronic switches are not conducted simultaneously. A third electronic switch is provided for connecting the high potential terminal of the charge capacitor and a not grounded terminal of a second output capacitor grounded at one side.

7 Claims, 11 Drawing Sheets

DOUBLE AND TRIPLE BOOSTER CIRCUIT OF PRESENT INVENTION

TRIPLE BOOSTER CIRCUIT OF PRESENT INVENTION

TRIPLE BOOSTING CONTROL SIGNAL OF PRESENT INVENTION

DOUBLE AND TRIPLE BOOSTER CIRCUIT OF PRESENT INVENTION

LEVEL SHIFTER

LEVEL SHIFTER

SWITCH CONTROL SIGNAL

GATE SIGNAL

CONVENTIONAL TRIPLE BOOSTER CIRCUIT

CONVENTIONAL TRIPLE BOOSTING CONTROL SIGNAL

CONVENTIONAL DOUBLE AND TRIPLE BOOSTER CIRCUIT

CHARGE PUMP-TYPE BOOSTER CIRCUIT

CROSS REFERENCE TO THE RELATED APPLICATION

The present application has been filed with claiming priority based on Japanese Patent Application No. 2002-222291, filed on Jul. 31, 2002. Disclosure of the above-identified Japanese Patent Application is herein incorporated by reference.

BACKGROUND OF THE INVENTION

1. Field of the Invention

The present invention relates generally to a charge pump-type booster circuit. More particularly, the invention relates to a DC/DC converter circuit which converts a supplied direct current voltage into an arbitrary level of direct current voltage, and further particularly to a charge pump-type booster circuit generating a higher voltage from a single supply power source.

2. Description of the Related Art

A charge-pump type booster circuit constituted of one or more electronic switches, such as transistors and so forth, and one or more capacitors, is a circuit for boosting an externally supplied voltage to a required higher voltage. This circuit can be made compact and lightweight by integrating the electronic switch with semiconductor transistor, thin film transistor or the like. Therefore, the charge-pump type booster circuit is employed in portable equipments, such as cellular phone, personal computer and so forth.

One example of this kind of technology has been disclosed in Japanese Unexamined Patent Publication No. 2000-236658 and Japanese Unexamined Patent Publication No. Heisei 9-191639. FIG. 10 is a circuit diagram of one example of the conventional triple booster circuit already shown in FIG. 6 of Japanese Unexamined Patent Publication No. 2000-236658 and in FIG. 3 of Japanese Unexamined Patent Publication No. Heisei 9-191639.

This circuit is constructed with at least four charge switches, two charge capacitors, three boosting switches and an output capacitor holding boosted voltage and constantly grounded at one side.

A charge switch 11 connects a terminal 72 of an input power source 1 and a terminal 75 of a charge capacitor 61. A charge switch 12 connects a terminal 74 of the charge capacitor 61 and a grounding point 71. A charge switch 13 connects a terminal 72 of an input power source 1 and a terminal 79 of a charge capacitor 62. A charge switch 14 connects a terminal 78 of the charge capacitor 62 and a grounding point 71.

The boosting switch 21 connects the terminal 72 of the input power source 1 and the terminal 74 of the charge capacitor 61. The boosting switch 22 connects the terminal 75 of the charge capacitor 61 and the terminal 78 of the charge capacitor 62. The boosting switch 23 connects the terminal 79 of the charge capacitor 62 and a terminal 77 of an output capacitor 51.

Next, a timing chart of operation of the switch in FIG. 10 is shown in FIG. 11. When the charge switches 11, 12, 13 and 14 become conductive (ON) and the boosting switches 21, 22 and 23 become non-conductive (OFF), the charge capacitors 61 and 62 are connected to input power source 1 to be charged with an input voltage. Next, when the boosting switches 21, 22 and 23 become conductive (ON) and the charge switches 11, 12, 13 and 14 become non-conductive (OFF), the input power source 1 and the charge capacitors 61 and 62 are connected in series. Then, the output capacitor 51 is charged at triple of the input voltage, and triple boosted voltage is supplied to a load 52.

When a voltage is supplied to a display device built-in a portable equipment, it becomes necessary to generate a plurality of voltages for data line driving circuit, gate line driving circuit and so forth from a single power source. As an example of conventional construction, a circuit simultaneously supplying twice boosted voltage and three times boosted voltage is shown in FIG. 12. Difference to FIG. 10 is that the boosting switch 22, the output capacitor 53 and the load 54 are added for supplying twice boosted voltage to the load.

The boosting switch 22 connects the terminal 75 of the charge capacitor 61 and the terminal 76 of the output capacitor 53. The switch of this circuit operates at a timing shown in FIG. 11. This circuit is constructed at least with four charge switches, two charge capacitors, four boosting switches and two output capacitors holding boosted voltages.

When the electronic switch is constructed with MOS (Metal-Oxide Semiconductor) transistor, it becomes necessary to form the switch with a huge size of transistor in order to lower a resistance upon conduction of the switch, namely on resistance. Therefore, a layout area is increased according to increasing of number of switches. On the other hand, when the capacitors used for holding the charge and output are formed by external parts of the integrated circuit, such as ceramic capacitor or the like, increasing of number of capacitors serves as hindrance of decreasing of size and weight of the power source circuit. On the other hand, upon building in the capacitor in the integrated circuit, it results in increasing of layout area of the circuit.

When the booster circuit is applied to the portable equipment, decreasing of size and weight and decreasing of power consumption are demanded. In the charge pump-type booster circuit, it is effective to reduce number of capacitors for reducing weight and area. Also, reducing of number of switches forming the circuit may result in reduction of the area.

SUMMARY OF THE INVENTION

It is therefore an object of the present invention to provide a charge pump-type booster circuit which can reduce number of switches and capacitors as components of the charge pump-type booster circuit with maintaining comparable operation as prior art.

In order to accomplish the above-mentioned object, a charge pump-type booster circuit boosting an input voltage using a plurality of capacitors and a plurality of electronic switches, comprises:

one charge capacitor charged by the input voltage; and a plurality of output capacitors generating a voltage multiple of the input voltage using the input voltage and a terminal voltage of the charge capacitor.

In the charge pump-type booster circuit boosting the input voltage using a plurality of capacitors and a plurality of electronic switches includes the capacitor connected at least one electronic switch at both terminals and two or more output capacitors constantly grounded at one side.

In the preferred operation of the charge pump-type booster circuit, the charge capacitor is charged by the input voltage at a first timing, an input power source and a low potential terminal of the charge capacitor are connected to charge a first output capacitor grounded at one side by double of the input voltage generated at a high potential terminal of the charge capacitor at a second timing, and the low potential terminal of the charge capacitor and not grounded terminal of (N−2)th output capacitor holding (N−1) times boosted potential and constantly grounded at one terminal are connected for charging (N−1)th output capacitor constantly grounded at one terminal with a voltage which is N times of the input voltage generated at a high potential terminal of the charge capacitor at third and subsequent Nth timing where N is integer greater than or equal to three.

Also, in the charge pump-type booster circuit, the input voltage is boosted using a plurality of capacitors and a plurality of electronic switches by an operation charging the input voltage by the charge capacitor connected at least one electronic switch at both terminals, an operation charging the output capacitor constantly grounded at one side, and an operation boosting a potential at a high potential terminal of the charge capacitor to a potential higher than that of the charge capacitor by connecting a low potential terminal of the charge capacitor and a not grounded terminal of the output capacitor grounded at one side.

In the preferred construction, not grounded terminal of at least one output capacitor constantly grounded at one side is connected to a high potential terminal and a low potential terminal of the charge capacitor through a first electronic switch and a second electronic switch, and the first electronic switch and the second electronic switch are prevented from conducting simultaneously.

A voltage generated at not grounded terminal of at least one output capacitor constantly grounded at one side may be supplied to the load.

Preferably, after charging the input voltage to the charge capacitor and connecting an input power source and the low potential terminal of the charge capacitor, a voltage double of an input voltage, which is generated at the high potential terminal of the charge capacitor is charged to the output capacitor constantly grounded at one side by conducting the first electronic switch.

The charge pump-type booster circuit may further comprise a clock generator circuit generating more than or equal to three phases of clocks for switching the electronic switch.

The electronic switches varying connection may be formed with MOS transistors. In the alternative, the electronic switches varying connection may be formed with thin film transistors.

While not limitative, the foregoing charge pump-type booster circuit, the present invention may be characterized by a high potential terminal and a low potential terminal of a charge capacitor are selectively connected to a not grounded terminal of a first output capacitor constantly grounded at one side, through a first electronic switch and a second electronic switch. The first electronic switch and the second electronic switch are prevented from becoming conductive simultaneously. Also, the high potential terminal of the charge capacitor is connected to a not grounded terminal of a second output capacitor constantly grounded at one side through a third electronic switch. The third electronic switch and the second electronic switch are conducted simultaneously.

In the present invention, since many of the capacitors to be used for boosting are grounded at one side, when the electronic switch circuit is integrated, number of contacts connecting the integrated circuit and the capacitor is reduced as compared with the case where both terminals are connected to the electronic switches. On the other hand, the boosted voltage held in the output capacitor grounded at one side is supplied to the load by directly connecting the terminal not grounded to the load. Therefore, when a plurality of different boosted voltages are to be supplied to different loads, it becomes possible to perform necessary operation without additional capacitors and/or additional electronic switches.

More particularly, by connecting the low potential terminal of the charge capacitor 61 preliminarily charged by the input voltage and the input power source 1, the potential at the high potential terminal 75 of the charge capacitor 61 is boosted at double of the input voltage. Then, the first electronic switch 22 is conducted and the potential of the terminal 76 of the first output capacitor 53 which is not grounded becomes equivalent to the potential of the high potential terminal 75 of the charge capacitor 61.

Next, the second electronic switch 31 is conducted and the potential of the low potential terminal 74 of the charge capacitor 61 becomes equivalent to the twice of the input voltage which is the potential of the terminal 76 of the first output capacitor 53 which is not grounded. Thus, the potential of the high potential terminal 75 of the charge capacitor 61 is boosted to triple potential of the input voltage.

Then, in order to hold triple boosted potential in the second output capacitor 51 grounded at one side, the third electronic switch 32 connecting the high potential terminal 75 of the charge capacitor 61 and the not grounded terminal 77 of the second output capacitor 51, is conducted.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a charge pump-type booster circuit according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
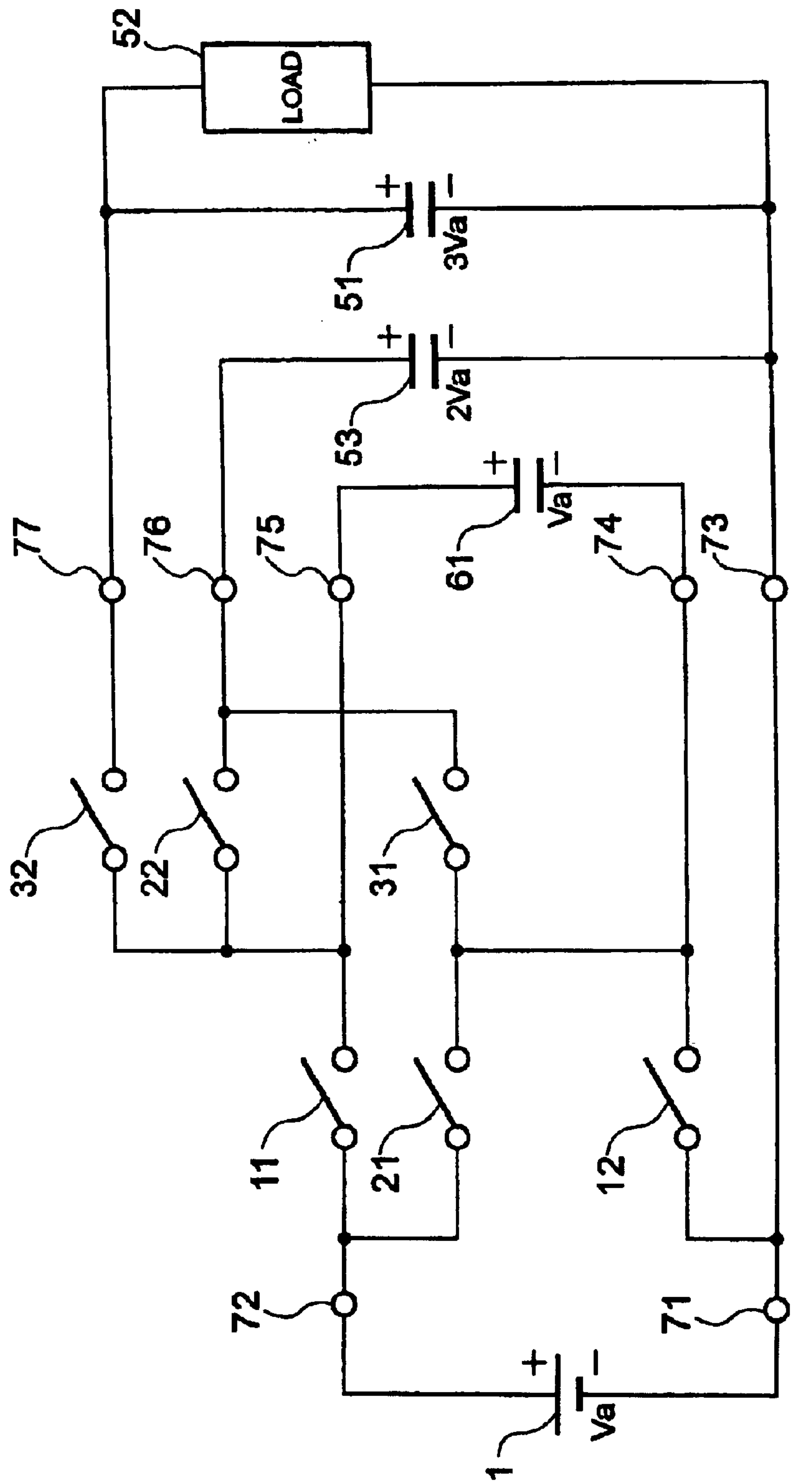
FIG. 1 is a circuit diagram of the first embodiment of a charge pump-type booster circuit according to the present invention.

FIG. 1 is a circuit diagram of the first embodiment of a charge pump-type booster circuit according to the present invention. FIG. 1 shows one example of a triple booster circuit. The shown triple booster circuit is constructed with two charge switches, one charge capacitor, four boosting switches and two output capacitors constantly grounded at one side.

The charge switch 11 connects the terminal 72 of the input power source 1 and the terminal 75 of the charge capacitor 61. The charge switch 12 connects the terminal 74 of the charge capacitor 61 and the grounding point 71. The boosting switch 21 connects the terminal 72 of the input power source 1 and the terminal 74 of the charge capacitor 61. The booster switch 22 connects the terminal 75 of the charge capacitor 61 and the terminal 76 of the output capacitor 53. A boosting switch 31 connects the terminal 76 of the output capacitor 53 and the terminal 74 of the charge capacitor 61. A boosting switch 32 connects the terminal 75 of the charge capacitor 61 and a terminal 77 of the output capacitor 51. Particular feature of the shown circuit is that the terminal 76 of the output capacitor 53, which terminal 76 is not grounded, is connected to the switch 22 and the switch 31. It should be noted that a triple boosting load is connected in parallel with the output capacitor 51.

Figure 2:
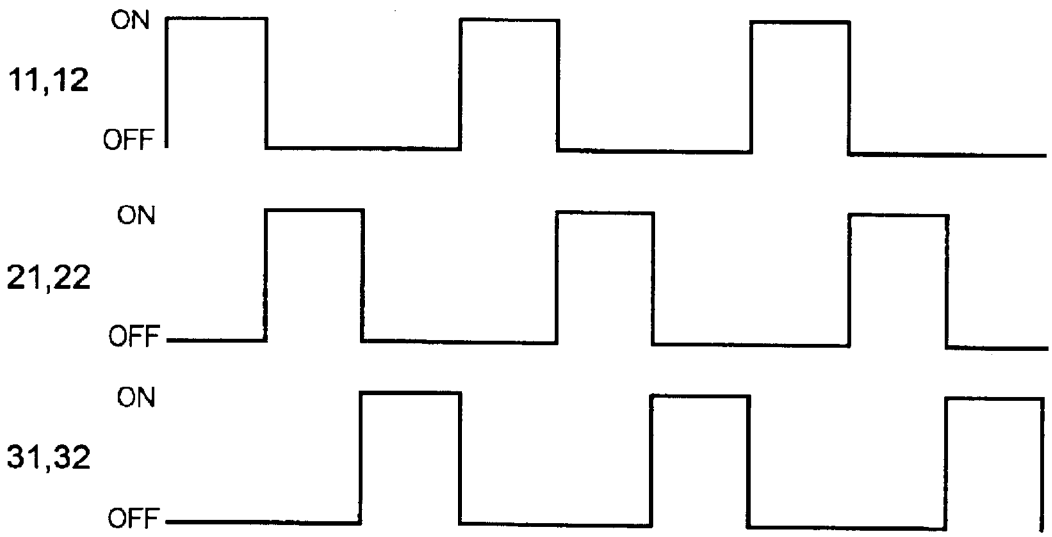
FIG. 2 is a timing chart of a control signal of a triple booster circuit according to the present invention.

Next, operation of the triple boosting circuit will be discussed. FIG. 2 is a timing chart of a control signal of the triple booster circuit according to the present invention. The triple booster circuit according to the present invention performs boosting operation by repeating conduction (ON) and non-conduction (OFF) at timings shown in FIG. 2.

At a first timing, the switches 11 and 12 become conductive and all other switches are non-conductive. At this time, the charge capacitor 61 is connected to the input power source 1. Thus, an input voltage (assumed as Va) is charged.

At a second timing, the switches 21 and 22 become conductive, and all other switches are non-conductive. Then, the input power source 1 and the charge capacitor 61 are connected in series. A double (2Va) of the input voltage (Va) is charged by the output capacitor 53.

At a third timing, the switches 31 and 32 become conductive and all other switches are non-conductive. Then, the output capacitor 53 charged double (2Va) of the input voltage (Va) and the charge capacitor 61 charged the input voltage (Va) are connected in series. Then, triple (3Va) of the input voltage is charged to the output capacitor 51. Then, triple boosted voltage (3Va) is supplied to triple boosted load 52.

The foregoing embodiment is a disclosure relating to triple boosting. However, this should be understood as representation of N times boosting of the input voltage (N is integer greater than or equal to three). Namely, at Nth timing, the output capacitor holding a voltage of (N−1) times of the input voltage and the charge capacitor are connected in series to charge N times of voltage of other output capacitor to supply N times of boosted voltage to the load.

Figure 3:
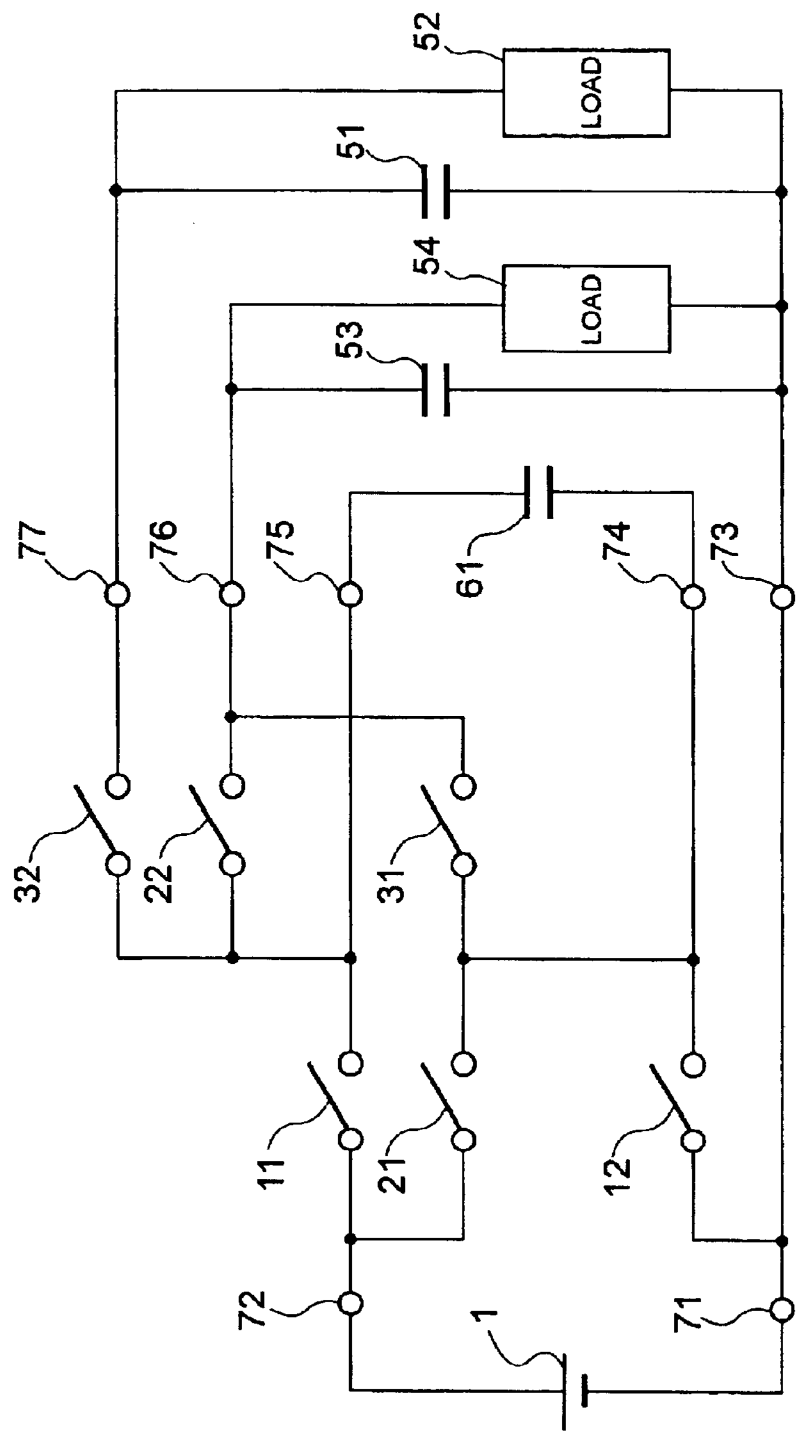
FIG. 3 is a circuit diagram of one example of twice and triple booster circuit according to the present invention.

Next, discussion will be given for the second embodiment. The second embodiment is directed to double and triple booster circuit. FIG. 3 is a circuit diagram showing one example of the double and triple booster circuit according to the present invention. It should be noted that in FIG. 3, like components to those shown in FIG. 1 are identified by like reference numerals and disclosure for such common components will be eliminated to avoid redundant disclosure and whereby to keep the disclosure simple enough to facilitate clear understanding of the present invention.

In the triple booster circuit of the present invention shown in FIG. 1, the output capacitor 53 is grounded at one side of the terminal, and then double of the input voltage is charged. Accordingly, as shown in FIG. 3, by connecting the double boosting load 54 to the terminal 76, a constant voltage of double of the input voltage is supplied.

Figure 12:
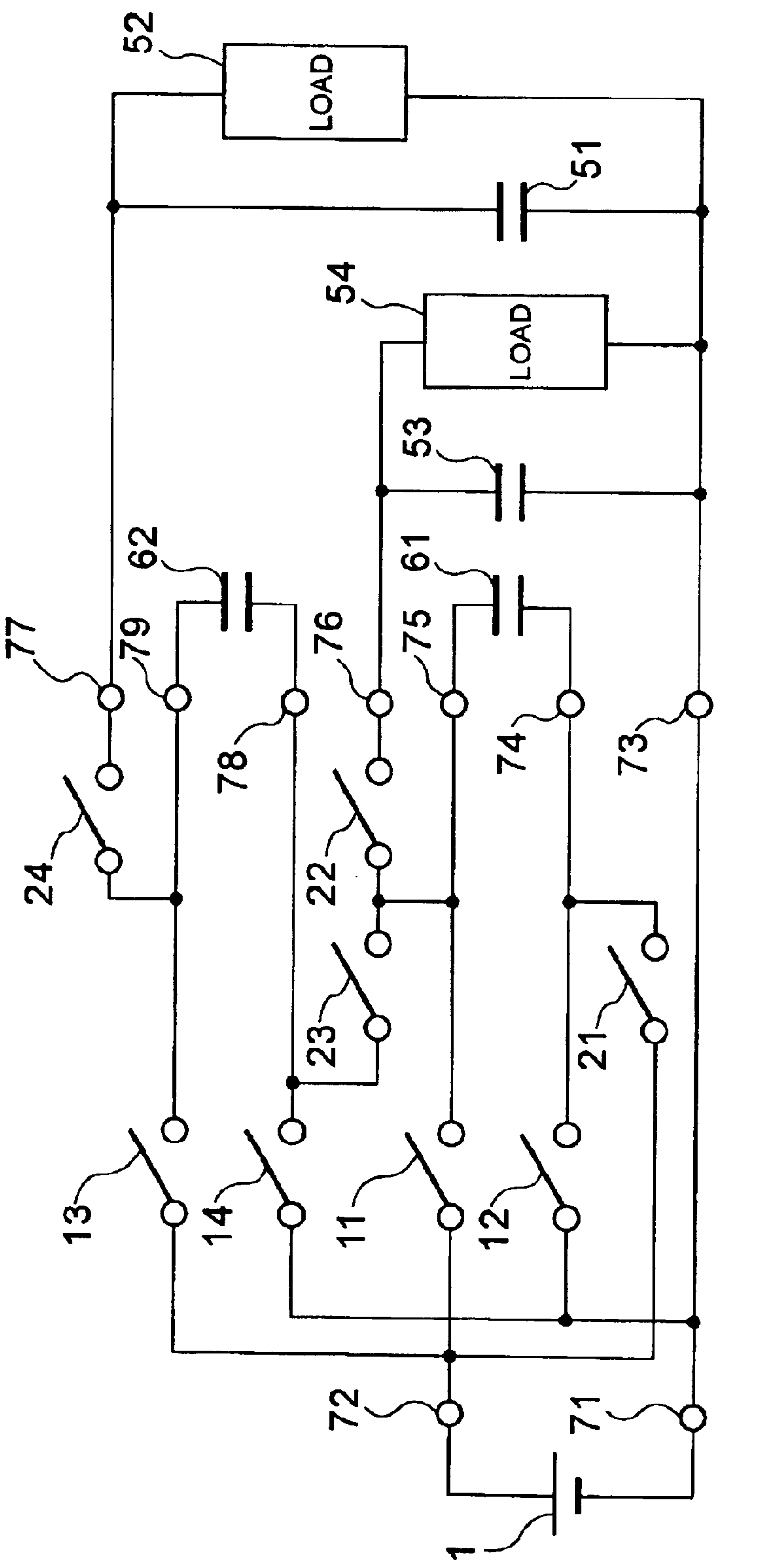
FIG. 12 is a circuit diagram of the conventional circuit simultaneously supplying two-times and three-times boosted voltages.

Comparing the shown embodiment with the conventional construction shown in FIG. 12, the functions are the same for simultaneously supplying double and triple boosted voltage. However, in the conventional construction, switches and capacitors are added in order to take out the double boosted voltage. In contrast to this, the present invention can achieve the same function with lesser number of switches and capacitors.

The foregoing embodiment is a disclosure relating to triple boosting. However, this should be understood as representation of N times boosting of the input voltage (N is integer greater than or equal to three) similarly the first embodiment. Namely, in the N times booster circuit, by connecting output capacitor holding double to N times boosted voltage and the load, double to N times boosted voltage are supplied simultaneously to the load.

Figure 4:
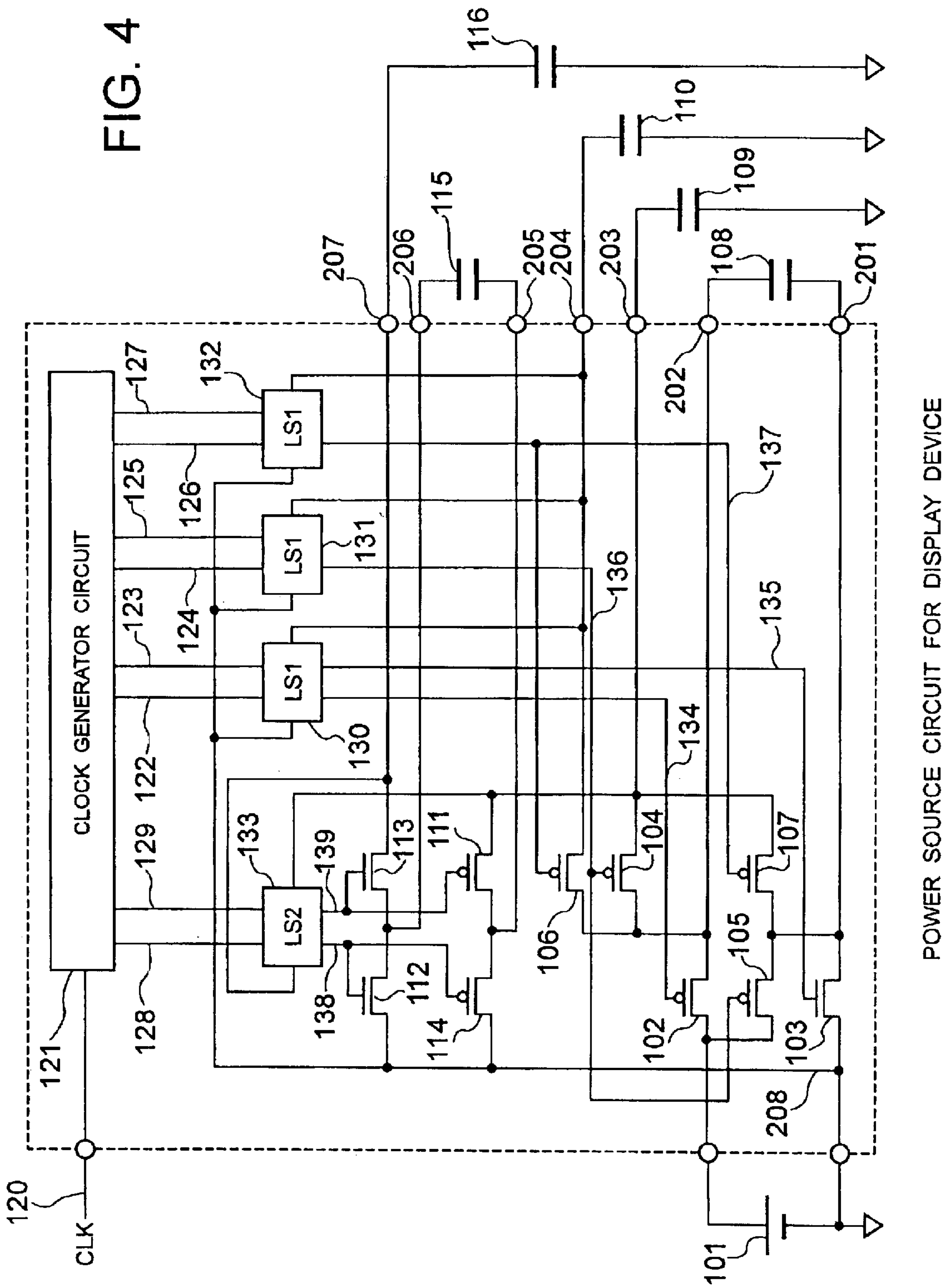
FIG. 4 is a circuit diagram of one example of a power source for a display device according to the present invention.

Next, the embodiment of the present invention will be discussed with reference to the accompanying drawings. The shown embodiment is related to a power source circuit for a display device generating necessary voltage to the display device. FIG. 4 is a circuit diagram of one example of the power source circuit for the display device according to the present invention.

Referring to FIG. 4, the power source circuit for the display device has a function for generating a double boosted voltage to be supplied to a data line driving circuit and a triple boosted voltage and minus double boosted voltage supplied to a gate line driving circuit. The power source circuit for the display device of the shown embodiment is constructed with a booster circuit, a clock (switch control signal) generator circuit and a level shifter (LS).

The switch forming the booster circuit is formed with MOS transistors. In FIG. 4, switches 102, 104, 105, 106, 107, 111 and 114 are formed with P-channel MOS transistors, and switches 103, 112 and 113 are formed with N-channel MOS transistors.

Figure 5:
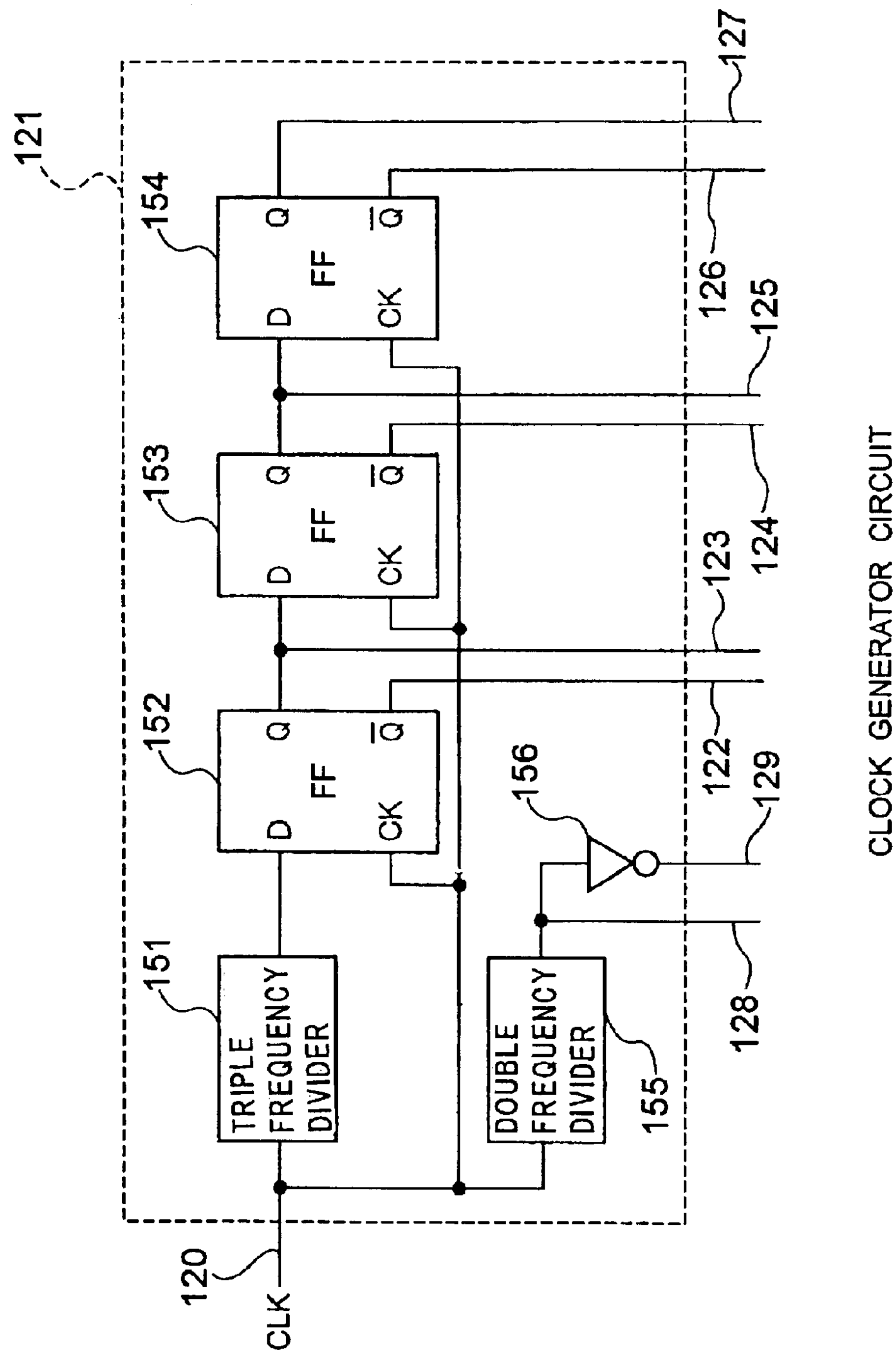
FIG. 5 is a circuit diagram of one example of a clock generation circuit.

FIG. 5 is a circuit diagram showing one example of a clock generator circuit. A clock generator circuit 121 is constructed with a triple frequency divider 151, flip-flop circuits 152, 153 and 154, a double frequency divider 155 and an inverter 156.

Figure 6:
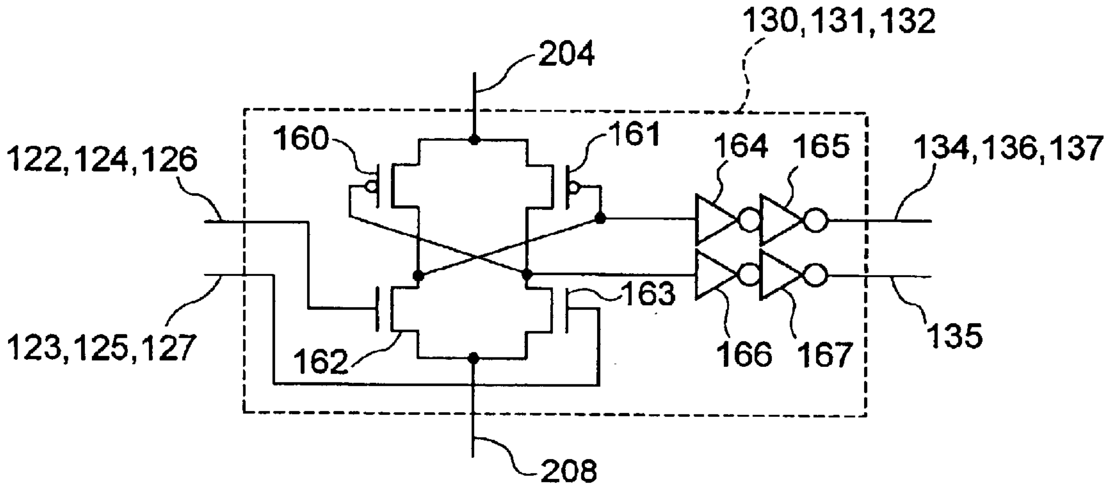
FIG. 6 is a circuit diagram of one example of a level shifter (LS1)
Figure 7:
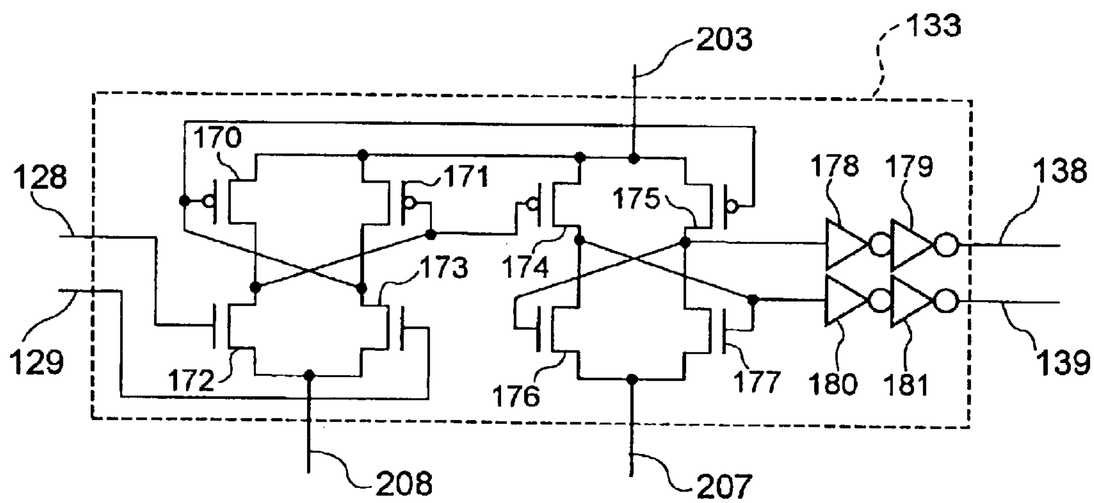
FIG. 7 is a circuit diagram of one example of a level shifter (LS2)

FIG. 6 is a circuit diagram of one example of a level shifter (LS1), and FIG. 7 is a circuit diagram of one example of a level shifter (LS2). The level shifters (LS1) 130, 131 and 132 shown in FIG. 6 are formed with MOS transistors and inverters. Likewise, the level shifter (LS2) 133 shown in FIG. 7 is formed with the MOS transistors and the inverters. Namely, referring to FIG. 6, the level shifter (LS1) is constructed with P-channel MOS transistors 160 and 161, N-channel MOS transistors 162 and 163 and inverters 164 to 167. Referring to FIG. 7, the level shifter (LS2) is constructed with P-channel MOS transistors 170, 171, 174 and 175, N-channel MOS transistors 172, 173, 176 and 177 and inverters 178 to 181.

In a polycrystalline silicon thin film transistor technology, data line driving circuit and the gate line driving circuit forming the display device tends to be integrated on the same glass substrate through the same process as the pixel driving thin film transistor contributing for reduction of number of parts and narrowing peripheral edge of the display device. Similarly to the shown embodiment of the power source circuit for the display device, it becomes possible to integrate the MOS transistor on the glass substrate of the display device by replacing it with the thin film transistor. Even in this case, the object of the present invention can be accomplished.

Figure 8:
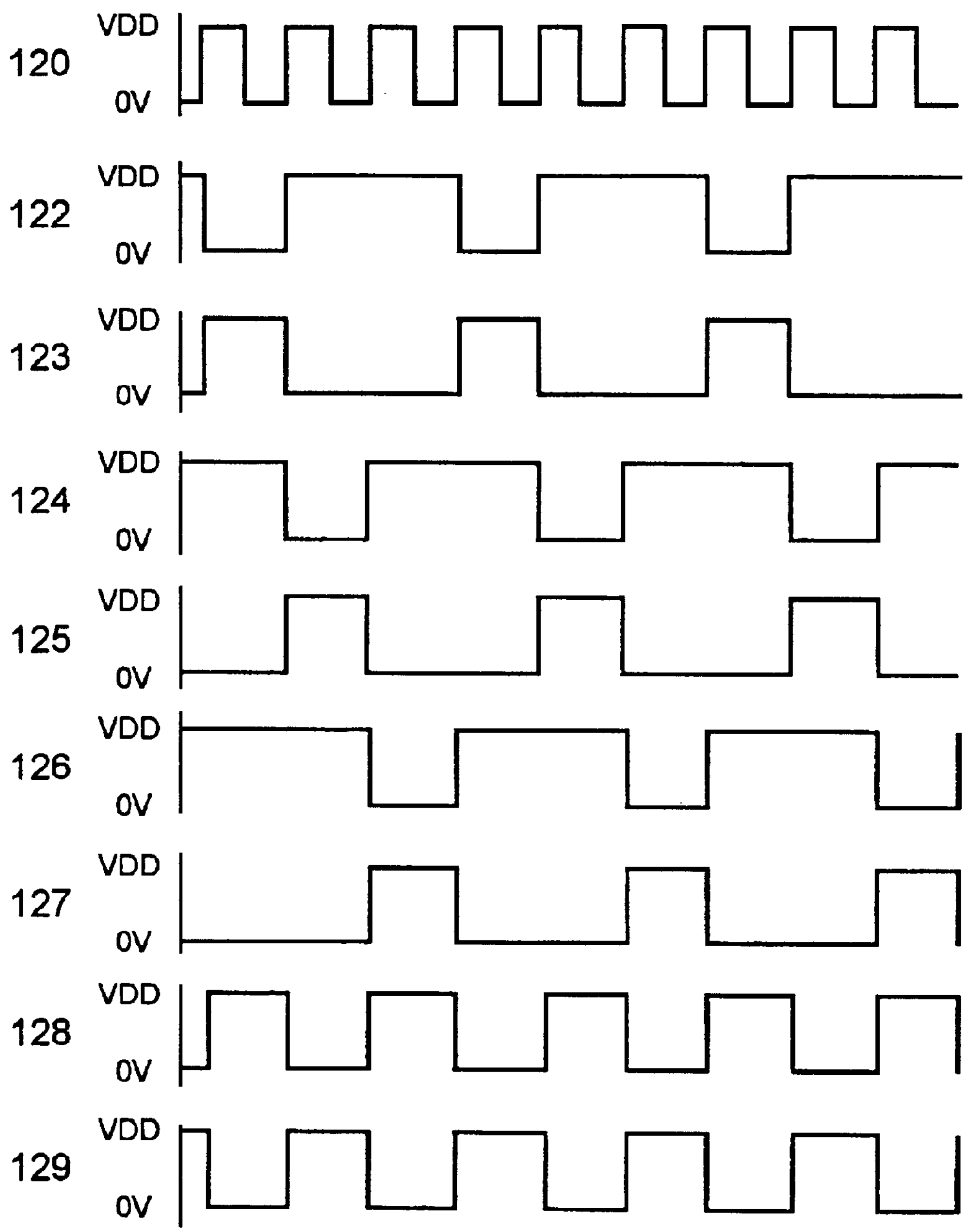
FIG. 8 is a timing chart of a switch control signal.

Hereinafter, operation of the shown embodiment will be discussed. The clock generator circuit 121 generates switch control signals 122 to 129 from the input clock 120. These switch control signals 122 to 129 are output at timings shown in FIG. 8.

Figure 9:
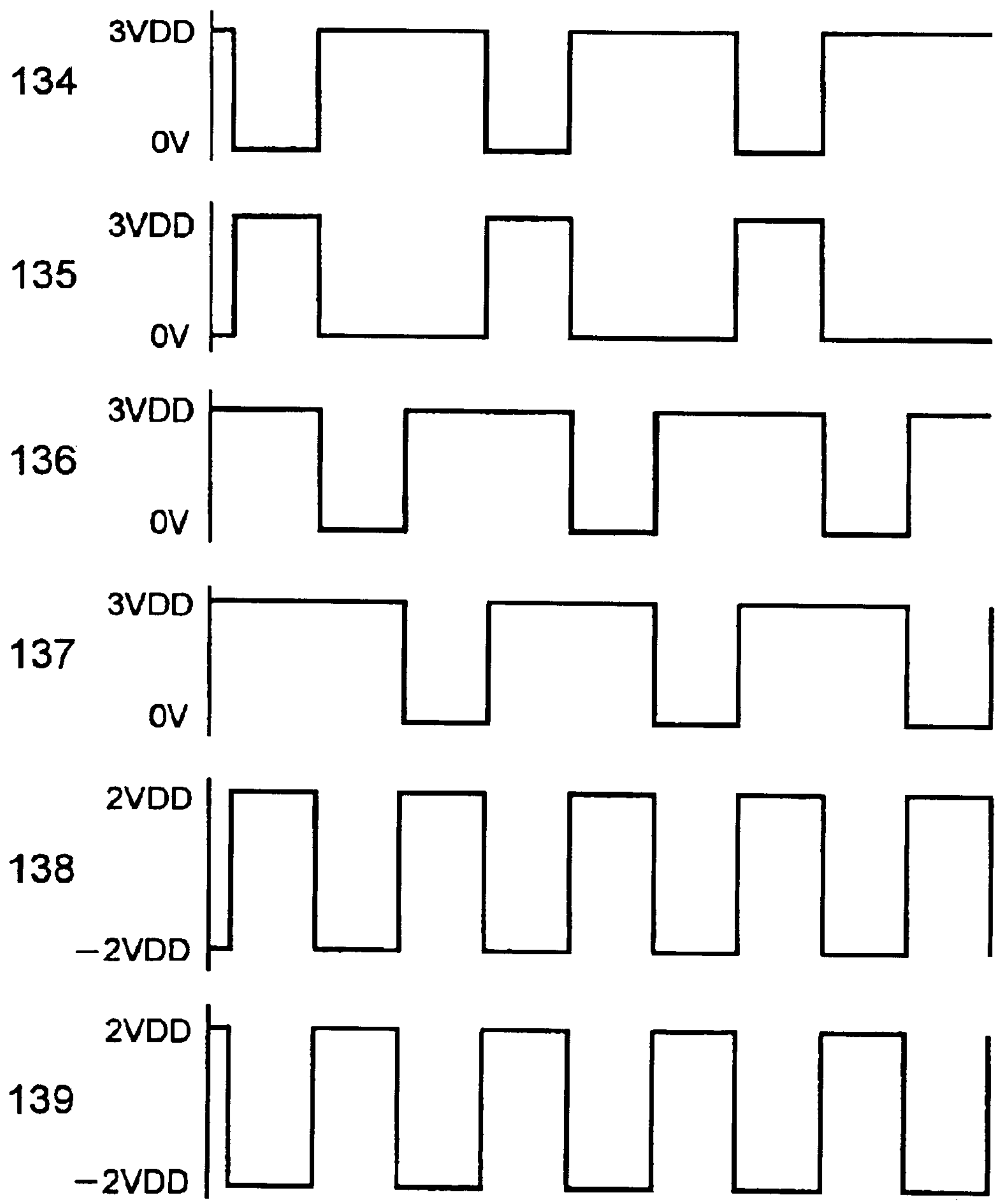
FIG. 9 is a timing chart of a gate signal.
Figure 10:
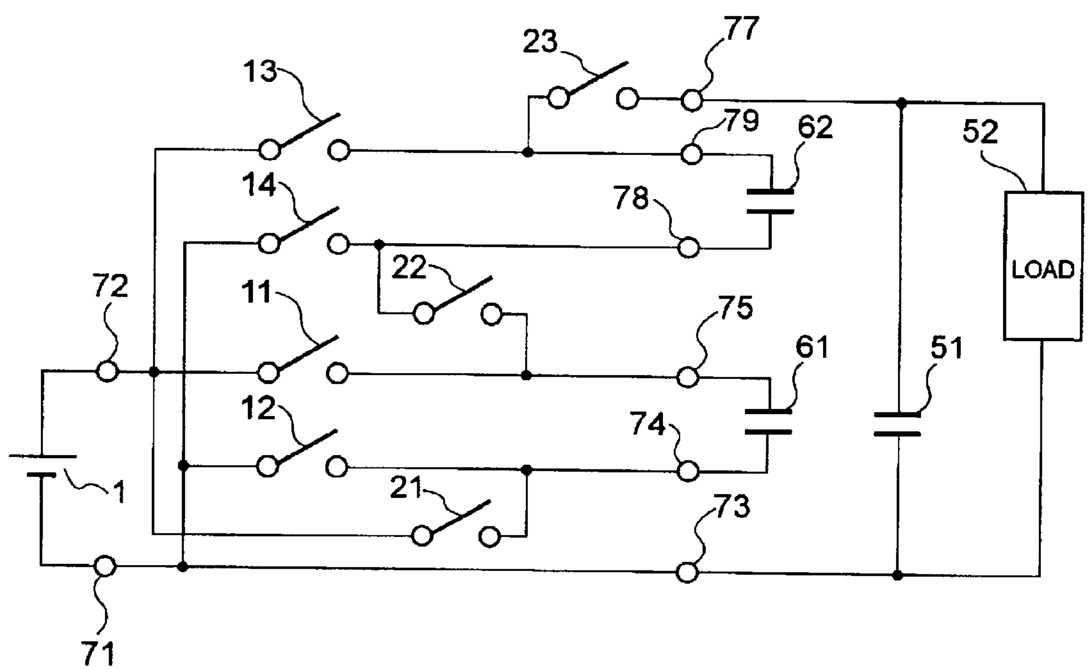
FIG. 10 is a circuit diagram of one example of the conventional triple booster circuit.
Figure 11:
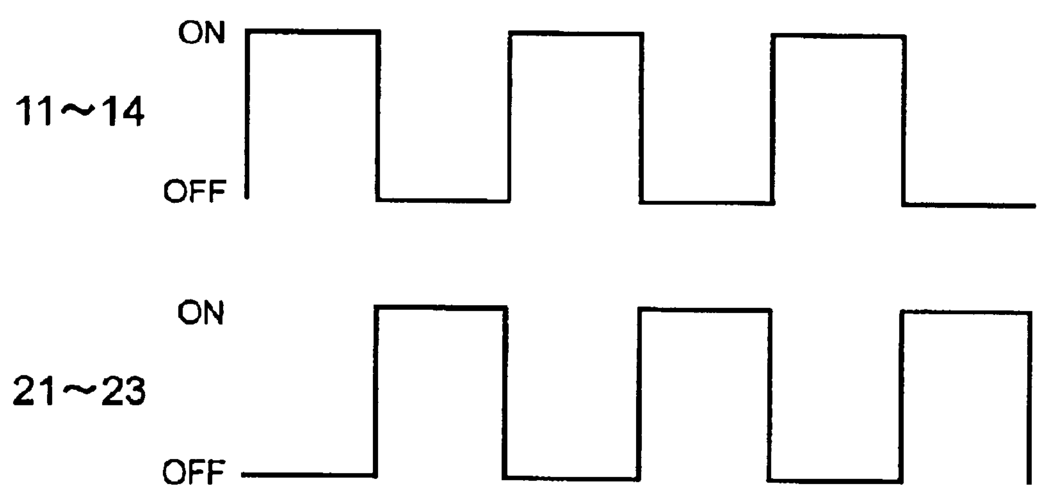
FIG. 11 is a timing chart of operation of switch in FIG. 10.

Next, the level shifter (LS1) 130, 131 and 132 convert levels of the switch control signals 122 to 127 of 0V to VDD into 0V to 3VDD to output the signals as gate signals 134, 135, 136 and 137, respectively. On the other hand, the level shifter (LS2) 133 converts levels of the switch control signals 128 and 129 of 0V to VDD into 0V to 2VDD to output the signals as gate signals 138 and 139. The gate signals 134 to 139 are output at timings shown in FIG. 9.

Next, discussion will be given for operation of the booster circuit. At first, when the gate signal 134 is 0V and the gate signal 135 is 3VDD, the P-channel MOS transistor 102 and the N-channel MOS transistor 103 are conducted. Then, the capacitor 108 is charged at VDD.

Next, when the gate signal 136 is 0V, the P-channel transistors 104 and 105 are conducted. Then, a potential of a terminal 201 becomes VDD and potentials of terminals 202 and 203 become 2VDD. Thus, the output capacitor 109 is charged at 2VDD.

Then, when the gate signal 137 is 0V, The P-channel MOS transistors 106 and 107 are conducted, the potential of the terminal 201 becomes 2VDD the same as the terminal 203, and the potentials of the terminals 202 and 204 become 3VDD. Thus, the output capacitor 110 is charged at 3VDD.

When the gate signal 138 is 2VDD and the gate signal 139 is −2VDD, the P-channel MOS transistor 111 and the N-channel MOS transistor 112 are conducted. Then, the potential of the terminal 205 becomes 2VDD the same as the terminal 203, and the potential of the terminal 206 becomes 0V. Accordingly, the capacitor 115 for inverting polarity is charged at 2VDD.

Next, when the gate signal 138 is −2VDD and the gate signal 139 is 2VDD, the P-channel MOS transistor 114 and the N-channel MOS transistor 113 are conducted. Then, the potential of the terminal 205 becomes 0V and the potentials of the terminals 206 and 207 become −2VDD by 2VDD charged for the capacitor 115 for inverting polarity. Thus, the output capacitor 116 is charged at −2VDD.

As set forth above, the charge-pump type booster circuit according to the present invention for boosting the input voltage using a plurality of capacitors and a plurality of switches, and includes one charge capacitor to be charged by the input voltage, and a plurality of output capacitors generating voltages of multiple of the input voltage using the input voltage and the terminal voltage of the charge capacitor. Therefore, even when numbers of the switches and capacitors as parts forming the charge pump type booster circuit are reduced, the charge pump-type booster circuits operable comparably with the conventional booster circuit can be provided.

In the charge pump-type booster circuit according to the present invention, the output capacitor which holds already boosted voltage and grounded at one side is used to obtain further higher voltage. Therefore, number of the charge capacitor connected the electronic switches at both sides, and number of electronic switches can be reduced to achieve the following effects.

First effect is that since the same boosted voltage can be obtained even by reducing number of electronic switches forming the charge pump-type N (N is integer greater than or equal to three) times booster circuit, area of the circuit can be reduced.

Second effect is that number of capacitors as external parts can be reduced. In N time booster circuit, a plurality of boosted voltages of 2 to N (N is integer greater than or equal to three) times can be supplied simultaneously. By this, a power source circuit requiring a plurality of voltages, such as the display device and so forth can be made compact.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A charge pump-type booster circuit, comprising:

a pair of input terminals for providing an input voltage;

a charge capacitor;

a first pair of switches capable of alternatively assuming a first condition, coupling said charge capacitor across said pair of input terminals to charge said charge capacitor to a voltage level substantially equal to the voltage level of the input voltage, and a second condition decoupling said charge capacitor from across said input terminals;

a first output capacitor;

a second pair of switches capable of assuming a first condition, coupling said first output capacitor across a first serial combination, comprising said input terminals and said charge capacitor, to charge said first output capacitor to a voltage level substantially twice the voltage level of the input voltage, and a second condition, decoupling said first output capacitor from said first serial combination;

a second output capacitor;

a third pair of switches capable of assuming a first condition, coupling said second output capacitor across a second serial combination, comprising said charge capacitor and said first output capacitor, to charge said second output capacitor to a voltage level substantially three times the voltage level of the input voltage, and a second condition, decoupling said second output capacitor horn said second serial combination;

a first load connected in parallel with said first output capacitor; and a second load connected in parallel with said second output capacitor.

2. The charge pump-type booster circuit as set forth in claim 1, wherein each of said switches comprises a thin film transistor.

3. A charge pump-type booster circuit, comprising:

a pair of input terminals for providing an input voltage;

a charge capacitor;

a pair of charge switches;

N output capacitors, identified in sequence as output capacitor number 1 to output capacitor number N; and N pairs of boosting switches, wherein:

said pair of charge switches is capable of alternatively assuming a first condition, coupling said charge capacitor across said pair of input terminals to charge said charge capacitor to a voltage level substantially equal to the voltage level of the input voltage, and a second condition decoupling said charge capacitor from across said input terminals, a first one of said pairs of boosting switches is capable of alternatively assuming a first condition, coupling output capacitor number 1 across a first serial combination, comprising said input terminals and said charge capacitor, to charge output capacitor number 1 to a voltage level substantially twice the level of the input voltage, and a second condition decoupling output capacitor number 1 from said first serial combination, a second one of said pairs of boosting switches is capable of alternatively assuming a first condition, coupling output capacitor number 2 across a second serial combination, comprising said charge capacitor and output capacitor number 1, to charge output capacitor number 2 to a voltage level substantially three times the input voltage level, and a second condition decoupling output capacitor number 2 from said second serial combination, each of the remaining pairs of boosting switches is capable of assuming a first condition, coupling an associated output capacitor number N across an associated serial combination, comprising output capacitor number (n−2) and output capacitor number (n−1), to charge said output capacitor number n to a voltage level at least equal to (n+1) times the input voltage level, N is an integer greater than 2, and n is an integer greater than 2 and less than or equal to N.

4. The charge pump-type booster circuit as set forth in claim 3, further comprising a load connected in parallel with one of said output capacitors.

5. The charge pump-type booster circuit as set forth in claim 3, further comprising a plurality of loads, each load connected in parallel with one of said output capacitors.

6. The charge pump-type booster circuit as set forth in claim 3, further comprising n loads, each load connected in parallel with one of said output capacitors.

7. The charge pump-type booster circuit as set forth in claim 3, wherein each of said charge switches and each of said boosting switches comprise a thin film transistor.

* * * * *